(12) United States Patent
Ruggeri

(10) Patent No.: US 10,356,041 B2
(45) Date of Patent: *Jul. 16, 2019

(54) SYSTEMS AND METHODS FOR CENTRALIZED DOMAIN NAME SYSTEM ADMINISTRATION

(71) Applicant: MASTERCARD INTERNATIONAL INCORPORATED, Purchase, NY (US)

(72) Inventor: Daniel A. Ruggeri, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,803

(22) Filed: Aug. 14, 2018

(65) Prior Publication Data

US 2018/0367500 A1    Dec. 20, 2018

Related U.S. Application Data

(63) Continuation of application No. 14/606,593, filed on Jan. 27, 2015, now Pat. No. 10,050,927.

(51) Int. Cl.
| | |
|---|---|
| *G06F 15/16* | (2006.01) |
| *H04L 29/12* | (2006.01) |
| *H04L 29/06* | (2006.01) |
| *H04L 29/08* | (2006.01) |
| *H04L 12/24* | (2006.01) |

(52) U.S. Cl.
CPC ......... *H04L 61/1511* (2013.01); *H04L 29/06* (2013.01); *H04L 29/08072* (2013.01); *H04L 41/0893* (2013.01); *H04L 67/1004* (2013.01); *H04L 67/1017* (2013.01); *H04L 69/329* (2013.01)

(58) Field of Classification Search
CPC .......................... H04L 29/06; H04L 29/08072
USPC ................................. 709/220, 223, 224, 228
See application file for complete search history.

(56) References Cited

U.S. PATENT DOCUMENTS

| | | | |
|---|---|---|---|
| 6,645,517 B2 | 11/2003 | West | |
| 7,814,229 B1 * | 10/2010 | Cabrera | ............. H04L 61/1511 709/228 |
| 7,860,847 B2 * | 12/2010 | Detlefs | ................. G06F 9/3842 707/674 |
| 8,261,351 B1 | 9/2012 | Thornewell | |
| 8,566,589 B1 | 10/2013 | Satish | |

(Continued)

*Primary Examiner* — Khanh Q Dinh
(74) *Attorney, Agent, or Firm* — Armstrong Teasdale LLP

(57) ABSTRACT

A Domain Name Service (DNS) administration computer system for centralized DNS administration includes at least one processor. The processor is configured to identify a first administrative action to be performed on a first DNS server. The processor is also configured to generate a first operation request message in an administrative language. The processor is further configured to transmit the first operation request message to a first DNS interface module associated with a first DNS server type of the first DNS server. The first DNS interface module is configured to perform one or more operational interactions with the first DNS server based at least in part on the first operation request, thereby performing the first administrative action on the first DNS server.

17 Claims, 6 Drawing Sheets

(56) References Cited

U.S. PATENT DOCUMENTS

| | | | | |
|---|---|---|---|---|
| 8,606,847 B2* | 12/2013 | Raghunath | ............... | H04L 45/00 |
| | | | | 709/203 |
| 8,645,517 B2* | 2/2014 | Stolorz | ............... | H04L 61/1511 |
| | | | | 709/219 |
| 8,688,775 B2* | 4/2014 | Penno | ................... | H04L 67/104 |
| | | | | 709/203 |
| 8,719,900 B2 | 5/2014 | MacCarthaigh | | |
| 8,775,524 B2 | 7/2014 | Nissennboim | | |
| 8,861,525 B1 | 10/2014 | Durand | | |
| 8,862,735 B1 | 10/2014 | Singh | | |
| 8,886,930 B1 | 11/2014 | Thornewell | | |
| 8,959,139 B2* | 2/2015 | Medved | ................... | H04L 45/00 |
| | | | | 709/203 |
| 9,015,469 B2* | 4/2015 | Prince | ................. | H04L 63/0823 |
| | | | | 713/153 |
| 9,557,889 B2* | 1/2017 | Raleigh | ................. | G06F 3/0482 |
| 9,955,332 B2* | 4/2018 | Raleigh | ................... | H04W 4/50 |
| 9,985,785 B2* | 5/2018 | Schefenacker | ......... | H04L 9/321 |
| 10,050,927 B2* | 8/2018 | Ruggeri | .............. | H04L 61/1511 |
| 2004/0133520 A1 | 7/2004 | Callas | | |
| 2008/0010377 A1 | 1/2008 | Nissennboim | | |
| 2008/0215718 A1 | 9/2008 | Stolorz | | |
| 2010/0049982 A1 | 2/2010 | Migault | | |
| 2011/0145386 A1 | 6/2011 | Stolorz | | |
| 2016/0219015 A1* | 7/2016 | Ruggeri | ............... | H04L 61/1511 |
| 2017/0250997 A1 | 8/2017 | Rostamabadi | | |

* cited by examiner

SYSTEMS AND METHODS FOR CENTRALIZED DOMAIN NAME SYSTEM ADMINISTRATION

CROSS REFERENCE TO RELATED APPLICATIONS

This application is a continuation application of U.S. patent application Ser. No. 14/606,593 filed Jan. 27, 2015, entitled "SYSTEMS AND METHODS FOR CENTRALIZED DOMAIN NAME SYSTEM ADMINISTRATION", the disclosure of which is hereby incorporated herein by reference in its entirety.

BACKGROUND OF THE DISCLOSURE

This disclosure relates generally to Domain Name System (DNS) services and, more particularly, systems and methods for centralized administration of DNS servers.

The DNS service is a network-based service that translates host names (e.g., "www.xyz-company.com") into network addresses recognizable by computing devices on the network. The most prolific example of DNS service is on the Internet, a TCP/IP-based network in which host names are commonly used to identify computing devices. On the Internet, DNS servers translate host names to Internet Protocol (IP) addresses to facilitate communications between computing devices. A business entity may, for example, provide one or more DNS servers on the Internet that provide name resolution for their own domain names (e.g., names associated with "xyz-company.com"). These DNS servers may be administered by the business entity during the course of business.

BRIEF DESCRIPTION OF THE DISCLOSURE

In one aspect, a Domain Name Service (DNS) administration computer system for centralized DNS administration is provided. The DNS administration computer system includes at least one processor. The processor is configured to identify a first administrative action to be performed on a first DNS server. The processor is also configured to generate a first operation request message in an administrative language. The processor is further configured to transmit the first operation request message to a first DNS interface module associated with a first DNS server type of the first DNS server. The first DNS interface module is configured to perform one or more operational interactions with the first DNS server based at least in part on the first operation request, thereby performing the first administrative action on the first DNS server.

In another aspect, a computer-based method for centralized DNS administration is provided. The method is implemented using a DNS action system including a processor and a memory. The method includes identifying a first administrative action to be performed on a first DNS server. The method also includes generating a first operation request message in an administrative language. The method further includes transmitting the first operation request message to a first DNS interface module. The first DNS interface module is configured to perform one or more operational interactions with the first DNS server based at least in part on the first operation request, thereby performing the first administrative action on the first DNS server.

In yet another aspect, at least one non-transitory computer-readable storage media having computer-executable instructions embodied thereon is provided. When executed by at least one processor, the computer-executable instructions cause the processor to identify a first administrative action to be performed on a first DNS server. The computer-executable instructions also cause the processor to generate a first operation request message in an administrative language. The computer-executable instructions further cause the processor to transmit the first operation request message to a first DNS interface module associated with a first DNS server type of the first DNS server. The first DNS interface module is configured to perform one or more operational interactions with the first DNS server based at least in part on the first operation request, thereby performing the first administrative action on the first DNS server.

BRIEF DESCRIPTION OF THE DRAWINGS

FIG. 1 is a diagram illustrating an example networked environment in which a DNS administration system manages a DNS server or "managed device".

FIG. 2 is a diagram illustrating an example networked environment in which the DNS administration system manages a plurality of managed devices.

FIG. 3 illustrates an example configuration of a user system operated by a user, such as the administrator shown in FIG. 2.

FIG. 4 illustrates an example configuration of a server system that may be used as, for example, the DNS administration system shown in FIGS. 1 and 2.

FIG. 5 is an example method for centralized DNS administration using, for example, the DNS administration system shown in FIGS. 1 and 2.

FIG. 6 shows an example configuration of a database within a computing device, along with other related computing components, that may be used to centrally administer DNS servers such as the managed devices shown in FIG. 2.

Like numbers in the Figures indicate the same or functionally similar components.

DETAILED DESCRIPTION OF THE DISCLOSURE

Figure 1:
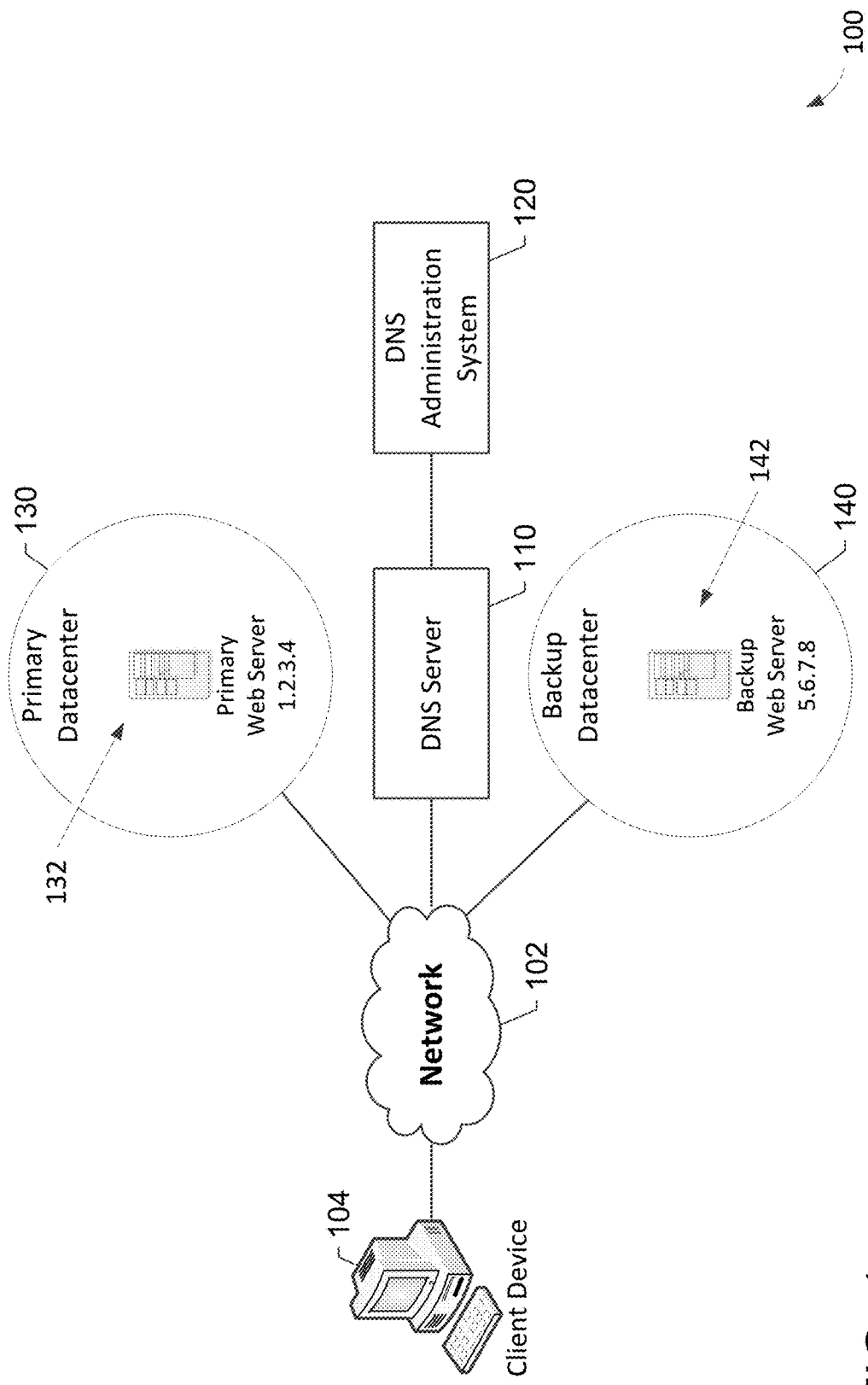
FIGS. 1-6 show example embodiments of the methods and systems described herein.

Systems and methods are described herein for centralized Domain Name Service (DNS) administration. In one aspect, systems and methods are provided for centrally administering a plurality of disparate DNS servers (e.g., different vendor devices and/or different DNS applications). A DNS administration system generates administrative operations (e.g., configuration changes) in an administrative language and transmits these messages to one or more interface modules. Each interface module is configured to interpret the administrative language and execute the administrative operations on a specific device type (e.g., a particular vendor's DNS service). The administrative language represents a common language that enables the DNS administration system to perform DNS administration operations across various disparate types of DNS servers, each type having their own interface module to execute the operations. In another aspect, enhanced DNS functionality is provided to DNS servers that may not natively provide such functionality. In yet another aspect, a plurality of DNS servers may be centrally and automatically managed based on network events.

More specifically, in one example embodiment, the DNS administration system manages several different types of network devices, such as various vendors' "rich" DNS service appliances (e.g., CISCO® GLOBAL SITE SELECTOR, or F5 NETWORKS® GLOBAL TRAFFIC MANAGER™), and/or "simple" name service applications such as Berkeley Internet Name Domain (BIND) service or MICROSOFT® ACTIVE DIRECTORY® (AD). In some embodiments, each of these "managed devices" may be name servers provided by a single business entity (e.g., "XYZ company"). Further, these managed devices may be Internet-facing (i.e., providing name services to other computers on the Internet) and/or intranet-based (e.g., name servers provided within the business entity's internal networks). (CISCO is a registered trademark of Cisco Systems, Inc., of San Jose, Calif.; F5 NETWORKS and GLOBAL TRAFFIC MANAGER are registered trademarks of F5 Networks, Inc., of Seattle, Wash.; MICROSOFT and ACTIVE DIRECTORY are registered trademarks of Microsoft Corporation, of Redmond, Wash.).

In some embodiments, DNS interface modules (also referred to herein as "management plug-ins" or just "interface modules" or "plug-ins") are provided that enable the DNS administration system to communicate with a plurality of managed devices of disparate types. For example, in some embodiments, the DNS administration system includes management modules for a plurality of rich DNS appliances and/or simple DNS services. Each of these interface modules are configured to convert administrative operations from an "administrative language" into operations on one or more particular types of managed devices.

The DNS administration system generates administrative operations ("operation requests") in the administrative language and transmits the operation request to the interface module associated with a managed device. The interface module parses the operation request, interprets what "administrative actions" are being requested, and performs those administrative actions on the managed device. Each of the various managed device types: (i) may have differing protocols for administratively communicating with the device and/or application; (ii) may make differing sets of administrative actions available; and/or (iii) may have differing syntaxes for performing particular administrative actions. The management interface modules for different device types enable the DNS administration system to generate administrative actions in a single language format and convey those commands through to differing device types by way of the various management interface modules for the particular devices. As such, the DNS administration system is able to effectively manage disparate DNS name services and devices.

Further, in some embodiments, the DNS administration system includes an "event agent" that is configured to perform system monitoring tasks and/or receive event messages from devices on the network. For example, the event agent may be configured to monitor the health of a particular "target server" (e.g., the primary web server for "www.xyzcompany.com"), or receive a Simple Network Management Protocol (SNMP) trap generated by another device that is monitoring that target server. If the target server becomes non-operational (e.g., power failure, system reboot), the event agent detects, or receives notice of, the event. The DNS administration system may be configured to take action upon certain events. For example, the DNS administration system may be configured to change one or more DNS records associated with "www.xyz-company.com" to redirect name requests to a backup web server. As such, the DNS administration system may execute automated DNS changes on the managed devices based on status changes on the network through, for example, an operation request in the administrative language passed through an interface module particular to the DNS server associated with the network event.

At least one of the technical problems addressed by this system includes: (i) DNS servers' lack of awareness of events on the network causing DNS servers to, for example, continue directing traffic to servers that are offline, resulting in failed network requests and added retransmissions; and (ii) administrative burden managing multiple disparate types of DNS servers.

A technical effect of the systems and processes described herein is achieved by performing at least one of the following steps: (a) identifying a first administrative action to be performed on a first DNS server; (b) generating a first operation request message in an administrative language; (c) transmitting the first operation request message to a first DNS interface module, wherein the first DNS interface module is configured to perform one or more operational interactions with the first DNS server based at least in part on the first operation request, thereby performing the first administrative action on the first DNS server; (d) generating a second operation request message in the administrative language; (e) transmitting the second operation request message to a second DNS interface module associated with a second DNS server type of a second DNS server, wherein the second DNS server type is different than the first DNS server type; (f) transmitting the first operation request message to one or more DNS interface modules including at least the first DNS interface module, wherein each DNS interface module of the one or more DNS interface modules is configured to perform operational interactions with an associated DNS server type based at least in part on operation request messages formed in the administrative language; (g) receiving an event message associated with a first computing device; (h) identifying a rule associated with the first computing device based at least in part on the event message; (i) generating the first operation request message based at least in part on one or more of the rule and the event message; (j) receiving the event message from a second DNS server, thereby enabling the second DNS server to instigate an administrative action on the first DNS server; (k) identifying a proactive monitoring event associated with a first computing device; (l) determining that an event associated with the first computing device has occurred based at least in part on the proactive monitoring event; (m) generating the first operation request message based at least in part on one or more of the rule and the proactive monitoring event; (n) generating a configuration data structure based on configuration data received from a user of the DNS administration system, the configuration structure defining logical configuration information for the first DNS server; and (o) generating at least one operation request including the first operating request based at least in part on the configuration data structure.

The technical effect achieved by this system is at least one of: (i) enabling dynamic DNS-based load balancing and/or failover in DNS servers that may not natively offer this function; (ii) dynamically and automatically initiate DNS changes based on conditions on the network; (iii) provide simplified and centralized management of a plurality of disparate DNS server types; and (iv) reduce training requirements for administrative staff not having to learn many different DNS server applications and/or platforms.

As used herein, the term "DNS server" is used generally to refer to any computing device and/or application that provides services associated with domain name services as are commonly known in the art (e.g., host name to IP address conversion). As mentioned above, DNS servers come in a variety of complexities, such as "rich" DNS appliances that include both their own hardware (e.g., processors, memory, network interface cards) and their own software (e.g., customized operating system and name service application), and "simple" DNS applications that may include only a name service application (e.g., BIND installed and running on a non-vendor-specific computing device).

The term "managed device" is used generally to refer to any DNS server that is managed by the DNS administration systems and methods described herein. The term "target server" is used generally to refer to a computing device that is the subject of the various DNS servers managed by the DNS administration system. For example, a DNS server may provide hostname resolution for the hostname "www.xyz-company.com". There may be one or more IP addresses associated with the hostname "www.xyz-company.com". The servers that host those IP addresses are referred to as "target servers" because they are the subject of the DNS server when the DNS server resolves "www.xyz-company.com".

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to administering Domain Name Service (DNS) and associated servers.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a diagram illustrating an example networked environment 100 in which a DNS administration system 120 manages a DNS server ("managed device") 110. In the example embodiment, networked environment 100 includes a network 102 that is a Transmission Control Protocol/Internet Protocol (TCP/IP) network and Universal Datagram Protocol (UDP) such as the Internet. Network 102 includes a plurality of client computing devices, such as client device 104, which communicate with one or more DNS servers, such as DNS server 110, during operation. DNS server 110 is managed by a DNS administration system 120. DNS server 110 may be, for example, a simple DNS server such as a BIND DNS server, or a rich DNS appliance such as commercially available from, for example, F5 Networks® or Cisco®.

In the example embodiment, DNS server 110 is a simple BIND DNS server that provides hostname resolution on network 102 for a fictitious hostname "xyz-company.com" and, more particularly, the hostname "www.xyz-company.com" for a fictitious company "XYZ". Company XYZ maintains a primary datacenter 130 and a backup datacenter 140 for their computing needs. Primary datacenter 130 includes a primary web server 132 that hosts (or is otherwise associated with) an IP address "1.2.3.4" that is accessible on network 102 (e.g., directly accessible for http request traffic to client device 104). Backup datacenter 140 includes a backup web server 142 that hosts (or is otherwise associated with) an IP address "5.6.7.8" that is similarly accessible on network 102. It should be noted here that the IP addresses used are selected for ease of explanation and do not necessarily conform to some aspects of traditional Internet Protocol.

During operation, in the example embodiment, client device 104 requests hostname resolution services for the hostname "www.xyz-company.com" which is provided by DNS server 110. In normal operational situations, DNS server 110 resolves hostname "www.xyz-company.com" with the IP address of primary web server 132 (e.g., "1.2.3.4"). In other words, when client device 104 requests the IP address for "www.xyz-company.com", DNS server 110 provides "1.2.3.4". As such, client device 104 subsequently sends http requests to primary web server 132.

However, in some operational situations such as a failure of primary web server 132, the XYZ company may wish to "fail over" web hosting to backup datacenter 140. In other words, the XYZ company may want to send web requests (e.g., from client device 104) to backup web server 142 rather than primary web server 132. In the example embodiment, DNS administration system 120 initiates an administrative action that, in this example situation, executes a configuration change on DNS server 110 that reconfigures DNS server 110 to resolve hostname "www.xyz-company.com" with IP address "5.6.7.8" (e.g., an A record change).

Details of DNS administration system 120 and the interactions between DNS administration system 120 and "managed devices" such as DNS server 110 are discussed below in greater detail with respect to FIG. 2.

Figure 2:
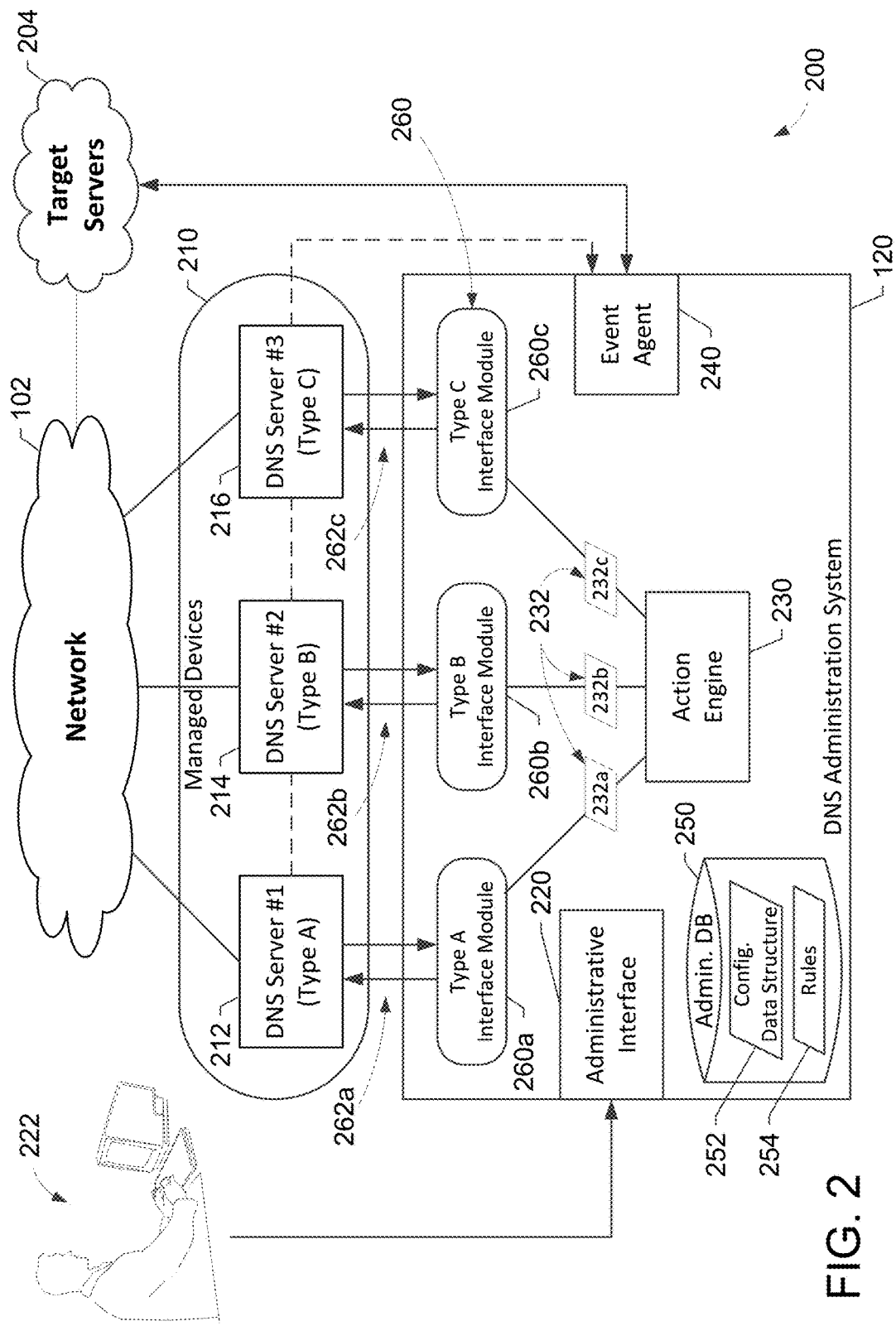

FIG. 2 is a diagram illustrating an example networked environment 200 in which DNS administration system 120 manages a plurality of managed devices 210 such as DNS servers 212, 214, and 216. In the example embodiment, networked environment 200 includes network 102 and a plurality of client computing devices (not shown in FIG. 2) such as client device 104 (shown in FIG. 1), which communicate with DNS servers 212, 214, and/or 216 during operation. Target servers 204 include computing devices that are the subject of the various managed devices 210. Target servers 204 may include, for example, primary web server 132 and backup web server 142 (both shown in FIG. 1).

Managed devices 210 may include DNS server 110 (shown in FIG. 1). In the example embodiment, managed devices 210 include disparate DNS server types. For example, DNS server #1 212 is of a first type ("Type A"), such as a BIND DNS server similar to DNS server 110, DNS server #2 is of a second type ("Type B"), such as Citrix® Netscaler® with Global Server Load Balancing (GSLB), and DNS server #3 is of a third type ("Type C"). It should be understood that the particular types of DNS servers shown in managed devices 210 are examples for illustrative purposes and may vary. The systems and methods described herein are not limited to the managed devices described herein, but could include any type of managed devices.

Also in the example embodiment, DNS administration system 120 includes an action engine 230 that is programmed to perform administrative tasks on managed devices 210, such as, for example, configuration changes or information collection, gathering and resetting of statistics from the nameserver (e.g., queries executed, query rate), purging of the DNS cache for zones or views, and stopping, starting, and restarting actions for configuration changes. In practice, different types of DNS servers facilitate different means, methods, application programming interfaces (APIs), commands, command syntax, authentication methods and/or communications protocols for enabling administrators to administer the name service application and/or the underlying operating system of the appliance. For example, some DNS servers may be manipulated via Hypertext Transfer Protocol (HTTP), while other DNS servers may use remote procedure call (RPC). As such, the steps to execute a particular administrative action may be different depending on the type of DNS server on which the change is to be made.

To facilitate performing operations on disparate types of DNS servers, and in the example embodiment, DNS administration system 120 includes a plurality of DNS interface modules ("interface modules" or "plug-ins") 260. Each interface module is programmed to interact with one or more types of DNS servers to perform various administrative actions with one or more managed devices 210 of those types. In the example embodiment, a Type A interface module 260a communicates with DNS Server #1 212, a Type B interface module 260b communicates with DNS Server #2 214, and a Type C interface module 260c communicates with DNS Server #3 216. For example, DNS Server #1 212 is a BIND DNS server, and Type A interface module 260a is configured to transfer new zone files an configurations to DNS Server #1 212 (e.g., via a Secure Shell (SSH) or File Transfer Protocol (FTP) client), and/or reload/apply the zone files or configurations (e.g., via a remote name daemon control (RNDC) client that contacts the administrative interface of BIND). Further, DNS Server #2 is a Citrix® Netscaler®, and Type B interface module 260b is configured to perform administrative operations via an HTTP/HTTPS client to communicate with an exposed application program interface (API) of Netscaler®.

Action engine 230, in the example embodiment, generates "operation requests" 232 associated with administrative actions to be performed on one or more managed devices 210. Operation requests 232 are formed in an "administrative language" understood by interface modules 260. Operation requests 232 include one or more requests for administrative actions to be performed on one or more managed devices 210. For example, an operation request 232 may include:

TABLE 1

| Example Operation Request for Adding an A-record |
|---|
| 1      <record name="www.xyz-company.com"> |
|         <location name="live site"> |
|            <value>1.2.3.4</value> |
|         </location> |
| 5      </record> |

The operation request shown in Table 1 represents a request to add an A record to a managed device (e.g., DNS Server #1 212) for mapping hostname "www.xyz-company.com" to IP address "1.2.3.4". In the example embodiment, the example operation request shown in Table 1 may be the same operation request 232 syntax sent regardless of the type of managed device that is the intended recipient. In other words, and for example, this example operation request may be sent to the BIND DNS Server #1 or the Netscaler® DNS Server #2 214. Each associated interface module (e.g., 260a and 260b) understands the example operation request as a request to add an A record, and subsequently performs the specific steps necessary for the particular type of DNS server to effectuate that change. Further, in some embodiments, operation request 232 may include all potentially usable attributes that a target DNS server may want. For example, a BIND DNS server may not have the concept of a location, where a more feature-rich DNS appliance may.

In the example embodiment, requests 232 are targeted to a specific device 210 based at least in part on attributes in administrative database 250. Administrative database 250 includes information to identify important attributes about the target device 210. For example, a server type of devices 210 may be stored, and may be used to indicate which module 260 to invoke to handle message 232. For another example, database 250 may also store information required to communicate with devices 210 such as IP addresses of devices 210, authentication credentials such as login names and passwords, based uniform resource locators (URLs) for API calls, and whether secure socket layer (SSL) is enabled. In some embodiments, at least some of this information may be queried via the associated interface module 260 when administrator 222 first configures the associated device 210 as a managed device.

Additionally, in the example embodiment, action engine 230 generates the same message 232 to all types of DNS servers since action engine 230 is not aware of what the target DNS server type is (e.g., this is a function of interface modules 260). For example, a request 232 may identify an administrative operation of creating a DNS round-robin configuration and send this same request 232 to both a BIND module 260a associated with DNS Server #1 212 and to a Netscaler module 260b associated with DNS Server #2 214. To execute this request, BIND module 260a would copy a new zone file with two IP addresses configured for "www.xyz-company.com" as the primary server in datacenter 130 and execute RNDC to reload the zone on BIND server 212, and Netscaler module 260b would execute an API call to the Netscaler administrative API on Netscaler server 214 to direct "www.xyz-company.com" to two IP addresses. For another example, a request 232 may identify an administrative operation of configuring a primary/backup configuration and send this same request 232 to both modules 260a and 260b for execution on devices 212 and 214, respectively. To execute this request on device 212, BIND module 260a would copy a new zone file with one IP address configured for "www.xyz-company.com" as the primary server in datacenter 130 and execute RNDC to reload the zone, configure event agent 240 to monitor the primary server in datacenter 130, and on a failure indication, copy a new zone file with one IP address configured for "www.xyz-company.com" as the secondary server in datacenter 140 and execute RNDC to reload the zone. To execute this same request on device 214, module 260b would execute an API call to device 214 to configure a primary GSLB vserver directed to the primary server in datacenter 130 with a backup vserver pointed to the secondary server in datacenter 140, and in some embodiments, (1) event agent 240 may be configured to monitor the primary server in datacenter 130 and on a failure event generate a request 232 that causes module 260b to execute an API call to Netscaler device 214 to disable the primary vserver and enable the backup vserver, or (2) execute an API call to Netscaler device 214 to configure the monitoring policy on the GSLB vserver.

In some embodiments, monitoring may be required to detect failures, and rules may be required to generate requests 232 based on those failure conditions. Depending on what type of monitoring is needed and what the capabilities of the DNS server itself are, event agent 240 may implement the functionality of the monitoring policy via native methods available to the more feature rich appliances, or through more direct methods of polling and action. For example, BIND may not natively support ping-based monitoring, but another rich DNS application such as Netscaler may.

Further, operation requests 232 may include multiple components, or may include administrative actions that require multiple steps to be completed on managed device 210 before complete. For example, presume DNS Server #2 214 provides hostname service for "www.xyz-company.com", which includes two sites such as primary datacenter 130 and backup datacenter 140 (both shown in FIG. 1), each having a single web server (e.g., web servers 132, 142, both shown in FIG. 1) serving content associated with the associated web site. Also presume that administrator 222 submits a configuration operation for DNS Server #2 214 to perform an initial configuration for "www.xyz-company.com". In response to the request from administrator 222, action engine 230 generates operation request 232b as such:

TABLE 2

Example Operation Request for Adding an A-record

```
 1    <record name="www.xyz-company.com"
         loadBalanceMethod="RoundRobin"
         preferredLocation="Primary Datacenter">
         <location name="Primary Datacenter" weight="2">
 5         <value>1.2.3.4</value>
         </location>
         <location name="Backup Datacenter" weight="2">
           <value>5.6.7.8</value>
         </location>
10       <stickyMethod name="SourceIP"
           mask="255.255.0.0"
           timeout="500s">
         </record>
```

In the example embodiment, interface modules 260 convert standardized messages (e.g., in the administrative language of Tables 1 and 2) into vendor-specific or application-specific actions or "operational interactions" 262a, 262b, 262c (e.g., commands in the command-line language of a particular DNS server, such as the Netscaler® syntax shown in Table 3). For example, the example operation request provided in Table 2, when sent to the BIND interface module 260a, causes interface module 260a to construct the following zone file:

TABLE 3

Example DNS BIND zone file

```
 1    $TTL 86400;
      $ORIGIN xyz-company.com
      @ 1D IN SOA ns1.xyz-company.com. hostmaster.xyz-company.com. (
           12345678901 ; serial
 5         3H ; refresh
           15 ; retry
           1w ; expire
           3h ; minimum
         )
10       IN NS  ns1.xyz-company.com. ;
         IN NS  ns2.xyz-company.com. ;
      . . . <other records>
      www  IN A  1.2.3.4;
      www  IN A  5.6.7.8;
      . . . <other records>
```

Once constructed, module 260a transfers the zone file shown in Table 3 to the target server (BIND DNS server 212) via, for example, file transfer protocol (FTP), secure FTP, or secure copy (SCP), overwriting the existing zone file. Further, module 260a executes an RNDC command line command to finalize the requested operation:

rndc-s<IP address of 212>reload xyz-company.com

Additionally, when sent to interface module 260b, the example operation request provided in Table 2 causes interface module 260b to perform the following (command-line formatted) actions ("command actions") on the Netscaler DNS Server #2 214:

TABLE 4

Example DNS Server-specific Commands

```
 1   add gslb service "www.xyz-company.com-Primary Datacenter"
        1.2.3.4 HTTP 80 -siteName "Primary Datacenter"
     add gslb service "ww.xyz-company.com-Backup Datacenter" 5.6.7.8
        HTTP 80 -siteName "Backup Datacenter"
     add gslb vserver www.xyz-company.com HTTP -dnsRecordType A
        -lbMethod ROUNDROBIN -persistenceType SOURCEIP
        -persistenceID 1 -persistMask 255.255.0.0 -timeout 500
     bind gslb vserver www.xyz-company.com -serviceName "www.xyz-
        company.com-Primary Datacenter"
 5   bind gslb vserver www.xyz-company.com -serviceName "www.xyz-
        company.com-Backup Datacenter"
```

Further, as mentioned above, interface modules 260 may communicate with managed devices 210 using disparate methods of communication. For example, some DNS servers may utilize HTTP Representational State Transfer (REST) API or Perl API, while other servers may support RPC calls. Additionally, interface modules 260 may authenticate with managed devices 210 using disparate methods of authentication. Each interface module 260 is configured to communicate with, authenticate with, and perform command actions based on the associated device type.

In some embodiments, each module 260 converts from the common language used in operation requests 232 into the specific syntax or call type based on the nature of the target DNS server device 210 to be affected. The module 260, generally speaking, parses operation request 232 and identifies the configuration desired. If an explicit action is provided (e.g., for deletes), then the action performed may be the action provided in the message. If not, if this is a new configuration, then an add action takes place, and if this is an existing configuration, then the action is a reconfiguration. Further, if the target server supports this configuration natively, then the module 260 translates the common language operation request 232 directly to a native configuration syntax (e.g., of the target device 210). If the target server does not support the configuration natively, and (i) if the configuration can be accommodated by the DNS server 210 and the event agent 240 combined, then native capabilities are translated directly to native configuration syntax and unsupported capabilities are translated to event agent calls and/or rules, or (ii) if the configuration cannot be accommodated by the DNS server and event agent combined, then configuration components that cannot be supported are identified and a warning listing limitations encountered is generated.

For example, a "happy path" configuration, e.g., a weighted round robin load balancing at 2:3 ratio, is natively supported in Netscaler, but BIND requires three duplicate entries for a first server and two for a second server. For another example, the "duplicate path" described above, where there is a primary and a backup. For another example, a "warning/error path" configuration, e.g., round robin load balancing with response persistence, giving the same answer to a network as previously asked so long as activity continues. This is natively supported in Netscaler. The interface module 260b, during the pre-execution/configuration validation phase, would transmit a warning that all aspects of the configuration may be satisfied except for the persistence feature. Administrator 22 may then choose to continue with the limitation in place or reconfigure to a fully supported configuration.

In the example embodiment, DNS administration system 120 generates and/or maintains a common configuration data structure 252 that is used to represent the present configuration of managed devices 210. For example, the configuration data structure for managed devices 212, 214, and 216 may be:

TABLE 5

Example Configuration Data Structure 252

```
 1   {
         "locations" : [
             "San Diego",
             "Hong Kong",
 5           "London"
         ],
         "servers" : [
             {
                 "name" : "lb1.xyz-company.com",
10               "type" : "ApplianceCompany1",
                 "url" : "https://ac1.xyz-company.local/API/",
                 "user" : "APIUser",
                 "pass" : "secret123"
             }
15           {
                 "name" : "lb2.xyz-company.com",
                 "type" : "ApplianceCompany2",
                 "url" : "https://dns.api.ac2cloud com/v1.0/1234567/",
                 "token" : "abcdef-1234-abc5-67890def"
20           }
             {
                 "name" : "lb3.xyz-company.com",
                 "type" : "DNSserverProvider1 - RPC",
                 "server" : "internaldns1",
```

TABLE 5-continued

Example Configuration Data Structure 252

```
25               "user" : "dnsadmin",
                 "pass" : "secret456"
             }
         ],
30       "records" : [
             {
                 "name" : "www.xyz-company.com",
                 "preferredLocation" : "Hong Kong",
                 "loadBalanceMethod" : "RoundRobin",
35               "stickyMethod" : [
                     {
                         "sourceIP" : {
                             "timeout" : "500s",
                             "mask" : "255.255.0.0"
40                       }
                     }
                 ],
                 "locations" : [
                     {
45                       "name" : "San Diego",
                         "values" : [ "4.5.6.7" ],
                         "weight" : 2
                     },
                     {
50                       "name" : "Hong Kong",
                         "values" : [ "1.2.3.4" ],
                         "weight" : 2
                     },
                     {
55                       "name" : "London",
                         "values" : [ "8.9.0.1" ],
                         "weight" : 2
                     }
                 ]
60           },
             {
                 "name" : "admin.xyz-company.com",
                 "preferredLocation" : "San Diego",
                 "loadBalanceMethod" : "preferredLocation",
65               "stickyMethod" : [ ],
                 "locations" : [
                     {
                         "name" : "San Diego",
                         "values" : [ "1.0.9.8" ],
70                       "weight" : 1
                     },
                     {
                         "name" : "Hong Kong",
                         "values" : [ "7.6.5.4" ],
75                       "weight" : 1
                     },
                     {
                         "name" : "London",
                         "values" : [ "3.2.1.0" ],
80                       "weight" : 1
                     }
                 ]
             }
         ]
85   }
```

In the example configuration data structure shown in Table 5, the data is illustrated in JavaScript Object Notation (JSON). However, other representations are possible. Configuration data structure 252 may be stored in volatile memory, as one or more files in a filesystem, and/or in a database such as administration database 250.

In the example embodiment, and as shown in Table 5, the example configuration 252 is a simple setup that may be used to define two DNS records, "www.xyz-company.com" and "admin.xyz-company.com". Further, configuration 252 identifies three disparate datacenters, "Hong Kong", "London", and "San Diego", along with IP addresses of each site's servers. This is a simplified configuration for purposes of illustration. In the example embodiment, configuration 252 stores information necessary to interact with managed devices 210. For example, some DNS appliances and/or servers may be configured to be manipulated via HTTP calls, while other DNS appliances and/or servers may be configured to be manipulated via RPC. In other words, interface modules 260 perform operational interactions 262 with managed devices 210 based on the associated configuration of the particular managed device) to effect the administrative actions specified by operation requests 232.

Further, in the example embodiment, a particular managed device 210 does not necessarily have a load-balancing feature. For example, the DNSserverProvider1 server included in configuration 252 shown in Table 5 may not support DNS-based load balancing or automatic failover, so the DNS administration system 120 may assign only one IP address. Additionally, some configuration attributes may not be applicable to some types of DNS servers. For example, the DNS servers or appliances may have no concept of a "preferred datacenter" location, while other DNS servers or appliances may. In some embodiments, non-supported configuration attributes may still be included in configuration 252 and/or operation requests 232.

In the example embodiment, DNS administration system 120 includes an administrative interface 220 that enables a systems administrator 222 to interact with and configure DNS administration system 120. For example, administrative interface 220 enables administrator 222 to read, view, modify, and otherwise interact with configuration 252 and managed devices 210, as well as initiate administrative actions (e.g., that result in action engine 230 generating operation requests 232). Administrative interface 220 also performs authentication and/or authorization by, for example, verifying user credentials and restricting access to functions of DNS administration system based on user credentials.

Further, in the example embodiment, DNS administration system 120 includes an event agent 240. Event agent 240 is configured to prompt action engine to issue "automatic administrative actions". As used herein, the term "automatic administrative actions" is used generally to refer to administrative actions not initiated directly by a user such as administrator 222. In some embodiments ("proactive monitoring"), event agent 240 is configured to proactively monitor computing devices, services, and/or applications such as, for example, target servers 204, applications running on target servers 204, managed devices 210, and/or networking communications equipment (not separately shown). In other embodiments ("prompted actions"), event agent 240 is configured to receive communications from other computing devices such as target servers 204, managed devices 210, or networking equipment. In both cases, event agent 240 is configured to prompt action engine 230 to generate operation requests 232 to make DNS changes on managed devices 210 as described below.

In some embodiments, as mentioned above with respect to "proactive monitoring", event agent 240 is configured to monitor computing devices and/or services on network 102 for "proactive monitoring events". DNS administration system 120 includes rules 254 that define how event agent 240 monitors computing devices and what event agent 240 is monitoring for (i.e., the proactive monitoring event), as well as what administrative actions are to be performed under particular conditions (i.e., a "resultant administrative action") (e.g., what administrative actions/DNS changes are to be made to which particular managed devices 210 when a particular event or type of events is detected). For example, administrator 222 may configure a rule 254 that causes event agent 240 to monitor an HTTP service on a particular target server 204 (e.g., "httpd" on primary web server 132 of primary datacenter 130, as shown in FIG. 1). Event agent 240 may periodically perform a test to confirm, for example, that the httpd daemon on primary web server 132 is properly responding to requests for a web page for "www.xyz-company.com/index.html". If the test succeeds (e.g., httpd daemon properly responds to the request), event agent 240 may be configured to take no actions. If the test fails (e.g., no response is received, or an improper page is received), event agent 240 may be configured to initiate a DNS administration action (e.g., on DNS server 110 shown in FIG. 1). Continuing the example, rule 254 may prompt event agent 240 to initiate a reconfiguration of DNS server 110 and, more particularly, the A record for "www.xyz-company.com", to point to backup web server 142 at backup datacenter 140 (both shown in FIG. 1) (a "site fail-over" action).

Another example rule is to adjust the "weight" of a target server's response in a weighted round robin configuration based on SNMP monitoring of the load on the server. For example, event agent 240 may probe all target servers via SNMP for load (e.g., presume 3 servers with a load of 3, 3, and 6). DNS administration system 120 may compute an average load across all 3 servers of (3+3+6)/3=4.0. If any servers have a load value higher than the average (e.g., the third server has an above average load), then adjust the weight ratings accordingly. For example, the new loads may become 2, 2, and 1, thereby shifting load away from the third server. As such, action engine 230 would generate a request operation 232 to adjust the loads according to this new setting.

In some embodiments, proactive monitoring events may include monitoring that tests aspects associated with application monitoring that relate to name services, load balancing, and service availability. For example, proactive monitoring events may include ping (e.g., pinging an IP address to verify response), TCP/IP connectivity testing (e.g., attempting to open a connection on a particular port), health checking of managed devices (e.g., nslookup test requests sent to managed devices), interface module probe (e.g., probing the managed devices for information via a vendor-specified method). For another example, proactive monitoring may include gathering statistics from device 210 and performing analysis and subsequent actions based on those gathered statistics.

In other embodiments, as mentioned above with respect to "prompted actions", event agent 240 is configured to receive inbound communications, or "event message", from computing devices on network 102, such as from managed devices 210, target servers 204, or other computing devices on network 102 such as dedicated monitoring software systems. DNS administration system 120 includes rules 254 that define how event agent 240 reacts to particular "event messages" (e.g., what resultant administrative actions are to be made to which particular managed devices 210 when a particular event message is received). For example, administrator 222 may configure a rule 254 that causes event agent 240 to perform the example site fail-over action described above when event agent 240 receives a simple network monitoring protocol (SNMP) trap from a monitoring system indicating that primary web server 132 has stopped responding to network requests (e.g., during a power failure or reboot).

In some embodiments, event messages may include synchronous and/or asynchronous communications such as, for example, SNMP traps (e.g., listening on port 162 for SNMP traps), SNMP probes (e.g., probing SNMP object identifiers (OID) for threshold changes), syslog events (e.g., listening for syslog messages on port 514 for specific messages), RPC (e.g., listening for remote procedure call on port 530 for actions), web service (e.g., implement a small web server to receive Simple Object Access Protocol (SOAP) or REST web service calls), and/or SMTP email messages indicating failures.

In the example embodiment, proactive monitoring events and/or event messages cause event agent 240 to initiate administrative actions that, for example, make DNS changes as describe above. In other words, rules 254 may be configured such that automatic DNS changes are made in particular situations based on proactive monitoring events and/or event messages, causing action engine 230 to generate operation requests 232 for one or more managed devices 210 that effect one or more resultant administrative actions through interface modules 260. Further, rules 254 may be extensively configured with business logic to enable DNS administration system 120 to react to various simple and complex environmental changes automatically. For example, rules 254 may further define a "fail-back" condition such that event agent 240 may initiate, for example, changing DNS server 110 to point back to primary datacenter 130 when primary web server 132 is again operational. Rules 254 may be defined both for proactive monitoring events (e.g., event agent detecting when primary web server 132 has gone offline, thus causing DNS server 110 to redirect traffic away from primary web server 132) as well as prompted actions (e.g., primary web server 132 sending an RPC message to event agent 240 when the primary httpd daemon is up and functioning, thus causing the primary web server 132 to again receive traffic).

For another example, in some embodiments, a monitoring system (not shown) may send an event message to event agent 240 indicating that the load on a particular target server 204 has exceeded a threshold. Administrator 222 may have previously configured a particular rule 254 for the DNS server(s) associated with one or more hostnames associated with that target server, where the rule is designed to shift some load away from that target server to another target server when that load threshold event message is received. As such, action engine 230 generates an operation request 232 to the associated interface module 260 for the implicated DNS server(s) that increases the weight of the other target server and/or decreases the weight of the heavily loaded target server such that an increased percentage of load (e.g., web requests) are directed to the other target server. For another example, during a planned "disaster recovery" test, administrator 222 may execute a script on an administrative server (not shown) that contacts event agent 240 via HTTP REST calls that invoke one or more rules that cause, for example, a primary datacenter web server such as primary web server 132 to be taken out of service and a backup datacenter web server such as backup web server 142 to be placed into service.

In some embodiments, DNS administration system 120 enables "federation" between managed devices 210. For example, some managed devices 210 such as DNS Server #3 216 may be "rich" DNS servers that are capable of monitoring network events and generating event messages to send to event agent 240. Rules 254 may be configured such that the event message generated by, for example, DNS Server #3 216 may cause an administrative action to be taken on another managed device 210 (e.g., the "simple" BIND DNS Server #1 212). Further, in some embodiments, the administrative action may be taken on the same managed device 210 (e.g., DNS Server #3), thereby enabling a particular managed device 210 to initiate a change on itself (e.g., that it might not natively be able to automatically perform), through the administrative actions provided by DNS administration system 120.

In some embodiments, event messages generated by managed devices 210 to event agent 240 may be generated based on a state of the managed device itself. For example, two managed devices 210 may act as backup devices for each other (e.g., DNS Server #1 and DNS Server #2) and, as such, need to contain at least some mirrored or identical data. When a change is made to one managed device, e.g., DNS Server #1 212, that DNS server #1 212 may be configured to generate an event message to event agent 240 indicating a change in a particular rule, and perhaps the new or changed data itself. DNS administration system 120 may include a rule 254 that causes an administrative action (e.g., configuration change) to make a change on DNS Server #2 to match the new state of DNS Server #1 212 for that record. As such, event messages generated by managed devices 210 may effectively cause other administrative actions to be performed on the same or other managed devices 210 through the actions of DNS administration system 120 and event agent 240.

In the example embodiment, interface modules 260, action engine 230, event agent 240, administrative interface 220, and administration database 250 (i.e., the various components of DNS administration system 120) are executed on a single computing device. In other embodiments, one or more interface modules 260 may be provided on the managed device 210. For example, a vendor of DNS Server #3 216 may decide to write their own interface module for their DNS servers, and may install interface module 260c onto DNS Server #3 216. As such, during operation, action engine 230 may, for example, generate operation request 232c and transmit operation request 232c over, for example, a TCP/IP connection to interface module 260c residing on DNS Server #3 216. In some embodiments, interface modules 260 may be provided by vendors of managed devices 210 but for external use (e.g., for installation on DNS administration system 120).

Figure 3:
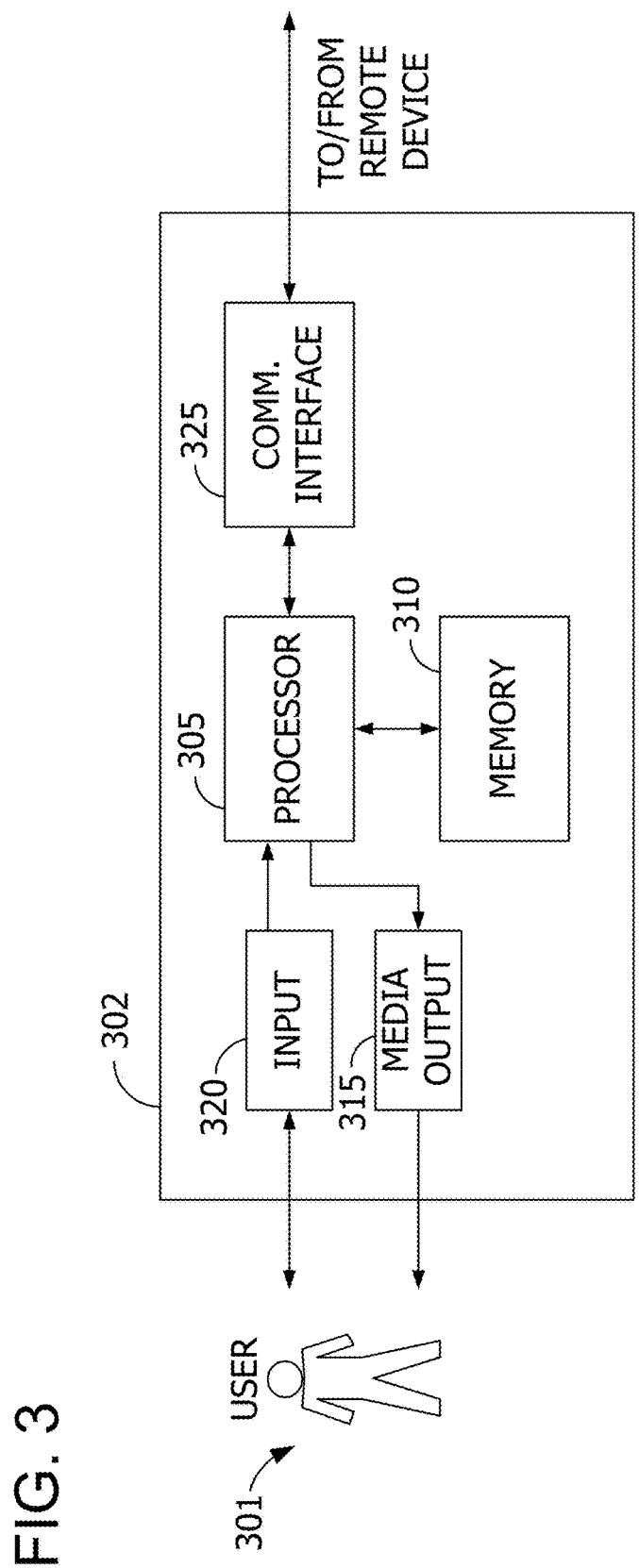

FIG. 3 illustrates an example configuration of a user system 302 operated by a user 301, such as administrator 222 (shown in FIG. 2). In some embodiments, user system 302 is a merchant system and/or a merchant POS device. In the example embodiment, user system 302 includes a processor 305 for executing instructions. In some embodiments, executable instructions are stored in a memory area 310. Processor 305 may include one or more processing units, for example, a multi-core configuration. Memory area 310 is any device allowing information such as executable instructions and/or written works to be stored and retrieved. Memory area 310 may include one or more computer readable media.

User system 302 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. User system 302 may also include a communication interface 325, which is communicatively couplable to a remote device such as DNS administration system 120 (shown in FIGS. 1 and 2). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website. A client application allows user 301 to interact with a server-side application.

In the example embodiment, computing device 302 is a user computing device from which user 301 engages with DNS administration system 120. For example, administrator 222 may use computing device 302 to interact with DNS administration system 120 through administrative interface 220 (shown in FIG. 2) to, for example, configure various managed devices 210 (e.g., DNS servers) through action engine 230 (shown in FIG. 2), install and configure interface modules 260 (shown in FIG. 2), and/or may configure rules 254 (shown in FIG. 2) that cause action engine 230 to generate operation requests 232 based on event messages received by event agent 240 (shown in FIG. 2).

Figure 4:
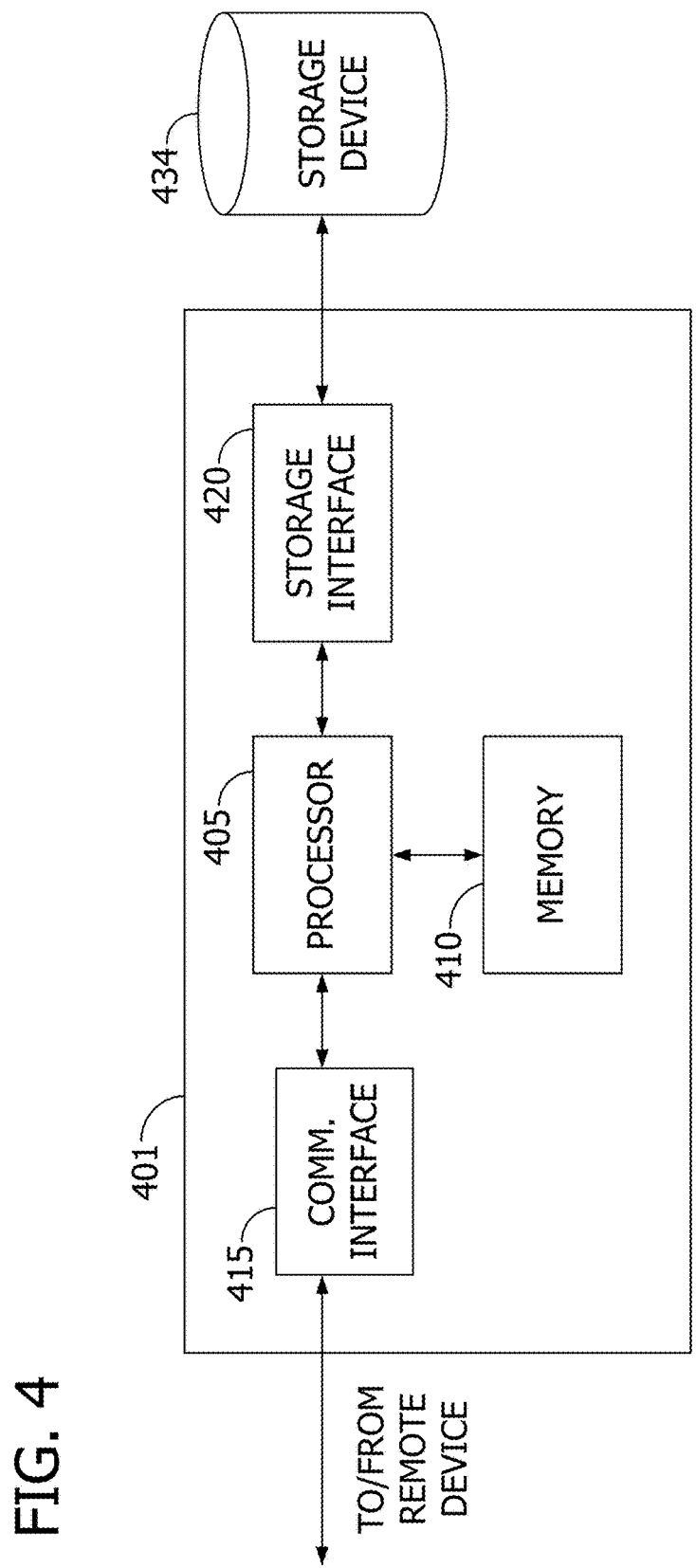

FIG. 4 illustrates an example configuration of a server system 401 that may be used as, for example, DNS administration system 120 (shown in FIGS. 1 and 2). Server system 401 may include, but is not limited to, DNS administration system 120, managed devices 210 (shown in FIG. 2), and/or target servers 204 (shown in FIG. 2).

Server system 401 includes a processor 405 for executing instructions. Instructions may be stored in a memory area 410, for example. Processor 305 may include one or more processing units (e.g., in a multi-core configuration) for executing instructions. The instructions may be executed within a variety of different operating systems on the server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device such as user system 302 (shown in FIG. 3) or another server system 401.

Processor 405 may also be operatively coupled to a storage device 434. Storage device 434 is any computer-operated hardware suitable for storing and/or retrieving data. In some embodiments, storage device 434 is integrated in server system 401. For example, server system 401 may include one or more hard disk drives as storage device 434. In other embodiments, storage device 434 is external to server system 301 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory area 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In the example embodiment, server system 401 is a DNS administration system, such as DNS administration system 120, in communication with one or more managed devices 210 and/or target systems 204. Server system 401 performs administrative actions on managed devices 210 and, in some embodiments, receives event messages from other computing devices.

Figure 5:
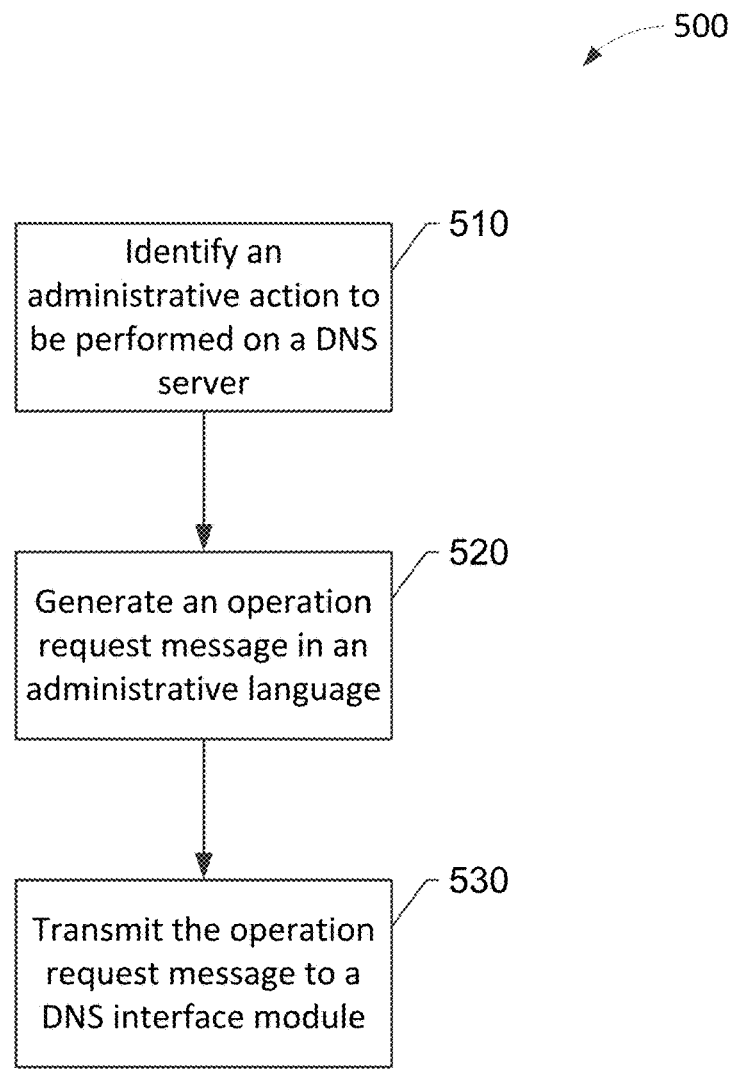

FIG. 5 is an example method 500 for centralized DNS administration using, for example, the DNS administration system 120 shown in FIGS. 1 and 2. In the example embodiment, method 500 is performed by a computing system such as server system (shown in FIG. 4). In the example embodiment, method 500 includes identifying 510 a first administrative action to be performed on a first DNS server. Method 500 also includes generating 520 a first operation request message in an administrative language.

Method 500 further includes transmitting 530 the first operation request message to a first DNS interface module, wherein the first DNS interface module is configured to perform one or more operational interactions with the first DNS server based at least in part on the first operation request, thereby performing the first administrative action on the first DNS server. In some embodiments, transmitting 530 the first operation request message to a first DNS interface module further comprises transmitting the first operation request message to one or more DNS interface modules including at least the first DNS interface module, wherein each DNS interface module of the one or more DNS interface modules is configured to perform operational interactions with an associated DNS server type based at least in part on operation request messages formed in the administrative language.

In some embodiments, method 500 includes generating a second operation request message in the administrative language, and transmitting the second operation request message to a second DNS interface module associated with a second DNS server type of a second DNS server, wherein the second DNS server type is different than the first DNS server type.

In some embodiments, method 500 includes receiving an event message associated with a first computing device, identifying a rule associated with the first computing device based at least in part on the event message, and/or generating the first operation request message based at least in part on one or more of the rule and the event message. Further, in some embodiments, receiving an event message further includes receiving the event message from a second DNS server, thereby enabling the second DNS server to instigate an administrative action on the first DNS server.

In some embodiments, method 500 includes identifying a proactive monitoring event associated with a first computing device, determining that an event associated with the first computing device has occurred based at least in part on the proactive monitoring event, and/or generating the first operation request message based at least in part on one or more of the rule and the proactive monitoring event.

In some embodiments, method 500 includes generating a configuration data structure based on configuration data received from a user of the DNS administration system, the configuration structure defining logical configuration information for the first DNS server, and/or generating at least one operation request including the first operating request based at least in part on the configuration data structure.

Figure 6:
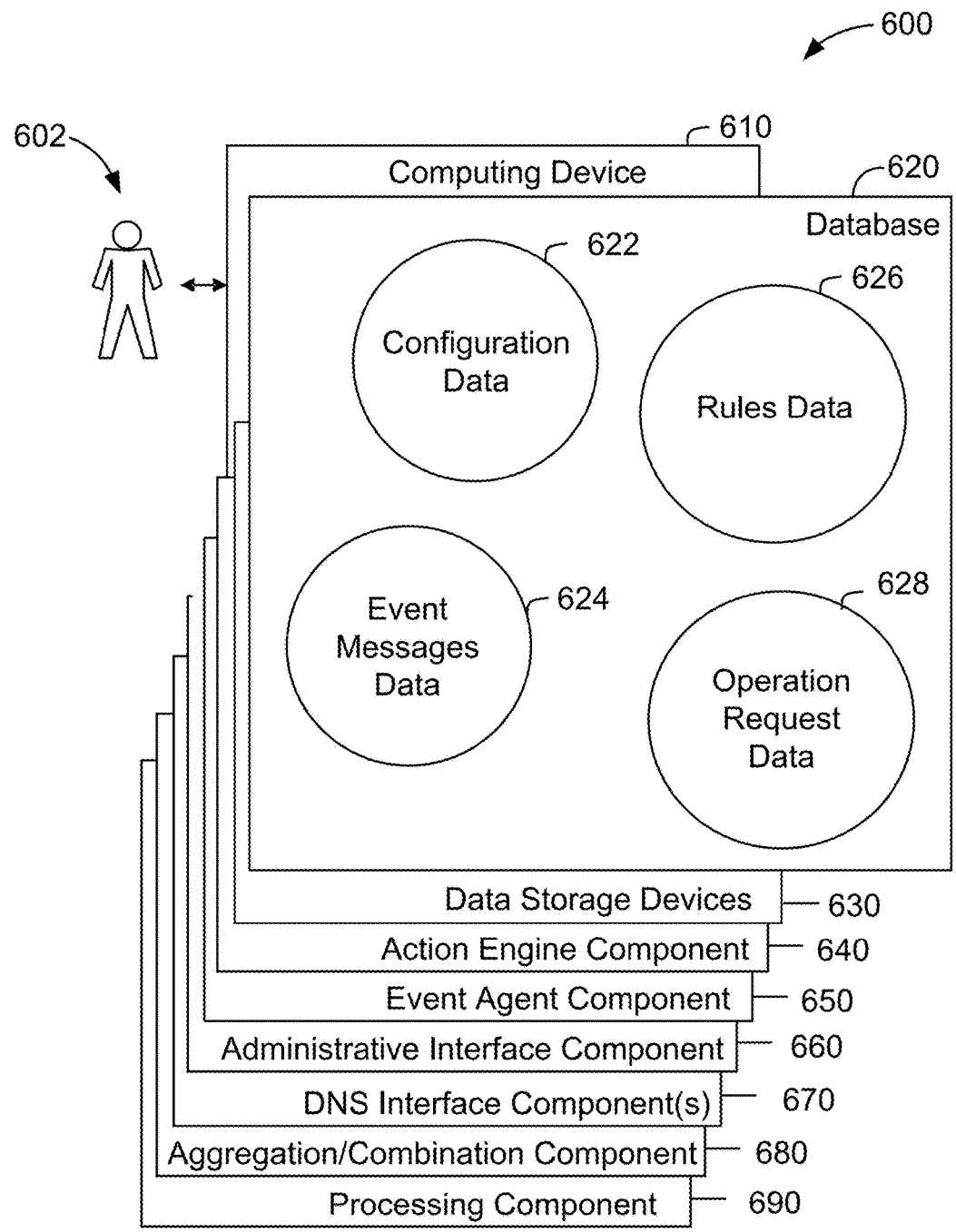

FIG. 6 shows an example configuration 600 of a database 620 within a computing device 610, along with other related computing components, that may be used to centrally administer DNS servers such as managed devices 210 (shown in FIG. 2). In some embodiments, computing device 610 is similar to DNS administration system 120 (shown in FIGS. 1 and 2) and/or server system 401 (shown in FIG. 4). Database 620 is coupled to several separate components within computing device 610, which perform specific tasks.

In the example embodiment, database 620 includes configuration data 622, rules data 626, event messages data 624, and operation request data 628. In some embodiments, database 620 is similar to administration database 250 (shown in FIG. 2). Configuration data 622 includes information associated with managed devices 210 (shown in FIG. 2). Event messages data 624 includes information associated with, for example, network events received or discovered by event agent 240 (shown in FIG. 2). Rules data 626 includes data associated with, for example, rules for automatic generation of administrative actions based on event messages, such as rules 254 (shown in FIG. 2). Operation request data 628 includes data associated with, for example, administrative actions for which action agent generates operation requests 232 (shown in FIG. 2).

Computing device 610 includes the database 620, as well as data storage devices 630. Computing device 610 also includes an action engine component 640 for generating operation requests (e.g., operation requests 232), and may be similar to action engine 230 (shown in FIG. 2). Computing device 610 also includes an event agent component 650 (e.g., event agent 240) for receiving event messages and/or detecting network events. An administrative interface component 660 is also included for enabling users 602 (e.g., DNS administrator 222 shown in FIG. 2) to interact with computing device 610. In some embodiments, one or more DNS interface components 670 are also included for conducting administrative operations on managed devices based on operation requests 232. A communications component 680 is included for communicating data between components. A processing component 690 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A Domain Name Service (DNS) administration computer system comprising at least one processor configured to:
   identify a first administrative action to be performed by a first DNS interface module in communication with a first DNS server of a first DNS server type, wherein the first administrative action includes a specific configuration to be performed on the first DNS server;
   generate a first operation request message including the first administrative action, wherein the first operation request message is in an administrative computer language configured to be readable by one or more DNS interface modules including the first DNS interface module, the one or more DNS interface modules in communication with one or more DNS servers including the first DNS server, the one or more DNS servers being of different DNS server types; and transmit the first operation request message to the first DNS interface module, wherein the first DNS interface module is configured to i) identify the specific configuration to be performed on the first DNS server, ii) convert the first operation request message into a syntax being compatible with the first DNS server, and iii) perform the first administrative action on the first DNS server based on the specific configuration.

2. The DNS administration computer system of claim 1, wherein the at least one processor is further configured to generate the first operation request message in response to identifying the first administrative action.

3. The DNS administration computer system of claim 1, wherein the administrative computer language is a single computer language.

4. The DNS administration computer system of claim 1, wherein the first DNS interface module is further configured to:
   interpret the administrative computer language of the first operation request message; and
   parse the first operation request message to identify a specific configuration to be performed on the first DNS server.

5. The DNS administration computer system of claim 1, wherein the first DNS interface module is further configured to convert the first operation request message into an operational interaction including a specific configuration.

6. The DNS administration computer system of claim 1, wherein the first operation request message causes a configuration process to be performed on the first DNS server including at least one of i) performing configuration changes, ii) gathering and resetting of statistics from the first DNS server, iii) purging of the first DNS server cache for zones or views, and iv) stopping, starting, and restarting actions for the configuration changes.

7. A computer-based method for centralized Domain Name Service (DNS) administration, the method implemented using a DNS administration computer system including a processor and a memory, said method comprising:
   identifying a first administrative action to be performed by a first DNS interface module in communication with a first DNS server of a first DNS server type, wherein the first administrative action includes a specific configuration to be performed on the first DNS server;
   generating a first operation request message including the first administrative action, wherein the first operation request message is in an administrative computer language configured to be readable by one or more DNS interface modules including the first DNS interface module, the one or more DNS interface modules in communication with one or more DNS servers including the first DNS server, the one or more DNS servers being of different DNS server types; and
   transmitting the first operation request message to the first DNS interface module, wherein the first DNS interface module is configured to i) identify the specific configuration to be performed on the first DNS server, ii) convert the first operation request message into a syntax being compatible with the first DNS server, and iii) perform the first administrative action on the first DNS server based on the specific configuration.

8. The method of claim 7, wherein generating a first operation request message further comprises generating a first operation request message in response to identifying the first administrative action.

9. The method of claim 7, wherein the administrative computer language is a single computer language.

10. The method of claim 7, wherein transmitting the first operation request message to the first DNS interface module further comprises transmitting the first operation request message to the first DNS interface module, wherein the first DNS interface module is further configured to:
    interpret the administrative computer language of the first operation request message; and
    parse the first operation request message to identify a specific configuration to be performed on the first DNS server.

11. The method of claim 7, wherein the first DNS interface module is further configured to convert the first operation request message into an operational interaction including a specific configuration.

12. The method of claim 7, wherein the first operation request message causes a configuration process to be performed on the first DNS server including at least one of i) performing configuration changes, ii) gathering and resetting of statistics from the first DNS server, iii) purging of the first DNS server cache for zones or views, and iv) stopping, starting, and restarting actions for the configuration changes.

13. At least one non-transitory computer-readable storage media having computer-executable instructions embodied thereon, wherein when executed by at least one processor, the computer-executable instructions cause the at least one processor to:
    identify a first administrative action to be performed by a first DNS interface module in communication with a first DNS server of a first DNS server type, wherein the first administrative action includes a specific configuration to be performed on the first DNS server;
    generate a first operation request message including the first administrative action, wherein the first operation request message is in an administrative computer language configured to be readable by one or more DNS interface modules including the first DNS interface module, the one or more DNS interface modules in communication with one or more DNS servers including the first DNS server, the one or more DNS servers being of different DNS server types; and
    transmit the first operation request message to the first DNS interface module, wherein the first DNS interface module is configured to i) identify the specific configuration to be performed on the first DNS server, ii) convert the first operation request message into a syntax being compatible with the first DNS server, and iii) perform the first administrative action on the first DNS server based on the specific configuration.

14. The computer-readable storage media of claim 13, wherein the computer-executable instructions further cause the at least one processor to generate the first operation request message in response to identifying the first administrative action.

15. The computer-readable storage media of claim 13, wherein the administrative computer language is a single computer language.

16. The computer-readable storage media of claim 13, wherein the computer-executable instructions further cause the at least one processor to transmit the first operation request message to the first DNS interface module, and wherein the first DNS interface module is further configured to:
    interpret the administrative computer language of the first operation request message; and parse the first operation request message to identify a specific configuration to be performed on the first DNS server.

17. The computer-readable storage media of claim 13, wherein the first operation request message causes a configuration process to be performed on the first DNS server including at least one of i) performing configuration changes, ii) gathering and resetting of statistics from the first DNS server, iii) purging of the first DNS server cache for zones or views, and iv) stopping, starting, and restarting actions for the configuration changes.

* * * * *